ELECTRONIC MULTIPLEX TELEGRAPH RECEIVING TERMINAL APPARATUS

INVENTORS
Philip E. Volz and
Eugene R. Shenk
BY
Charles H. Brown
ATTORNEY

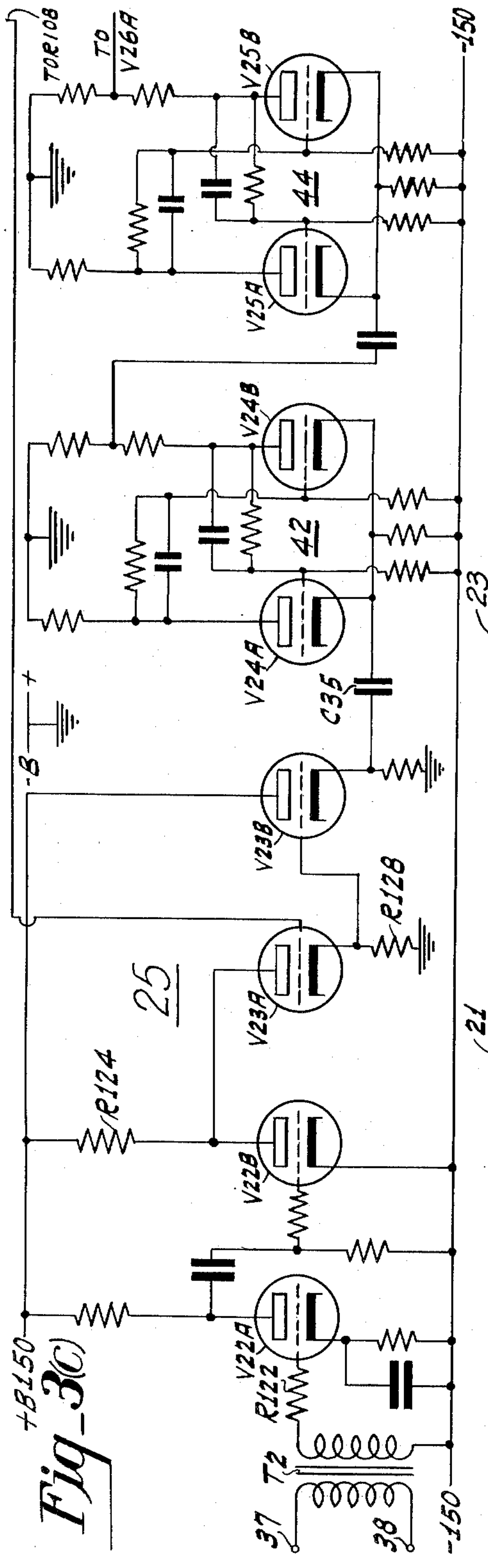
Fig_3(c)
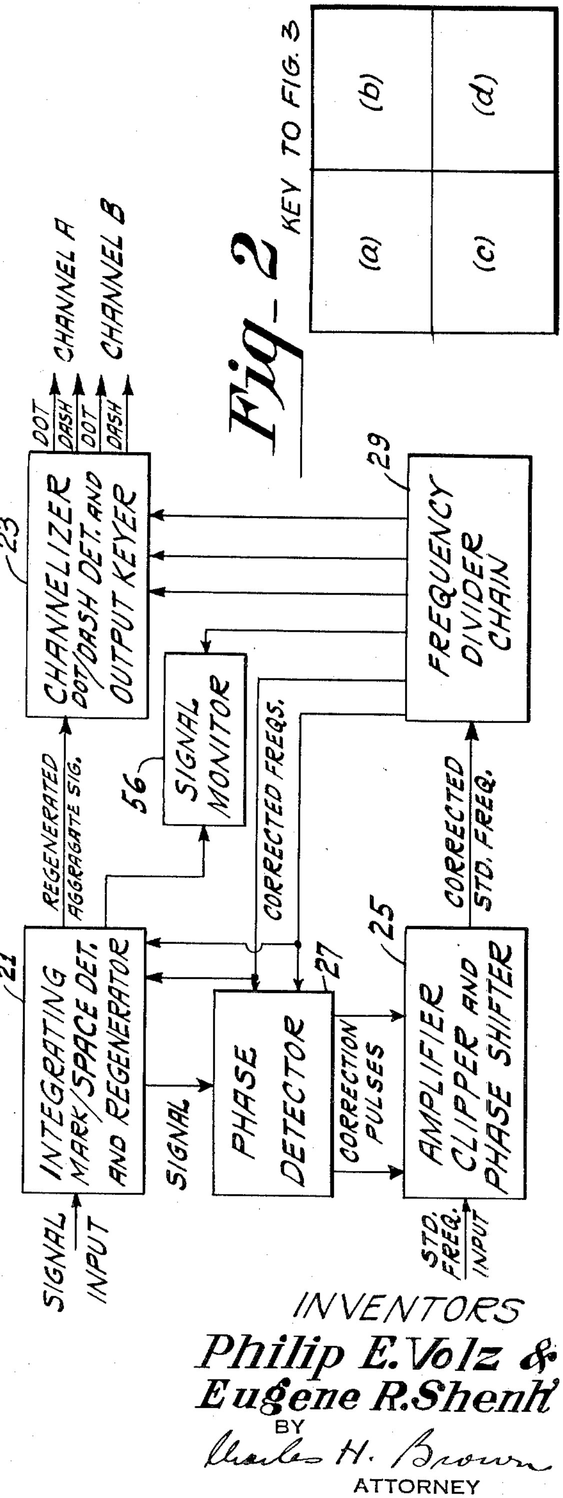
Fig_2 KEY TO FIG. 3
INVENTORS
Philip E. Volz &
Eugene R. Shenk
BY
Charles H. Brown
ATTORNEY INVENTORS
Philip E. Volz and
Eugene R. Shenk
BY
Charles H. Brown
ATTORNEY

ELECTRONIC MULTIPLEX TELEGRAPH RECEIVING TERMINAL APPARATUS

Filed Dec. 8, 1950 7 Sheets-Sheet 4

INVENTORS
Philip E. Volz and
Eugene R. Shenk
BY Charles H. Brown
ATTORNEY

INVENTORS
Philip E. Volz and
Eugene R. Shenk
BY
Charles H. Brown
ATTORNEY

ELECTRONIC MULTIPLEX TELEGRAPH RECEIVING TERMINAL APPARATUS

Filed Dec. 8, 1950 7 Sheets-Sheet 6

INVENTORS
Philip E. Volz and
Eugene R. Shenk
BY
Charles H. Brown
ATTORNEY

INVENTORS
Philip E. Volz and
Eugene R. Shenk
BY
Charles H. Brown
ATTORNEY

United States Patent Office 2,714,627 Patented Aug. 2, 1955

2,714,627

ELECTRONIC MULTIPLEX TELEGRAPH RECEIVING TERMINAL APPARATUS

Eugene Richard Shenk, Fairlawn, and Philip Eckert Volz, Florham Park, N. J., assignors to Radio Corporation of America, a corporation of Delaware Application December 8, 1950, Serial No. 199,764

21 Claims. (Cl. 178—50)

The invention relates to multiplex telegraph apparatus receivers and particularly to electronic multiplex receiving terminal apparatus designed to operate in conjunction with transmission of Higgitt, or modified double-current cable code, signals.

Cable code is composed of equal length signal elements of opposite polarity corresponding to the dots and dashes, and intermediate or zero polarity corresponding to the space elements, of unequal length continental Morse code for the various code combinations of characters comprising the letters of the alphabet, figures and special symbols. Higgitt code is composed of equal length elements of opposite nature occurring in a specific timed relationship. In reference to bistatic or two-condition signalling it is customary to refer to the two conditions of opposite nature as mark and space even though the actual conditions are produced by on-off, frequency shift, or polarity reversing keying. There being but two conditions of signal, spacing between elements of the message is indicated by extended elements of one nature. Each "dot" and "dash" element is equivalent to two elemental time intervals, the relative time of occurrence of the marking and spacing elements, or other bistatic signalling elements, being relied upon for distinction. Since the elements, even though of equal length, correspond to the dots and dashes of continental Morse code, they will be so referred to hereinafter. The groups of character elements are separated by time intervals the durations of which determine whether or not the preceding character elements constitute part of a single character, separate characters, or separate groups of characters or words. Because it is convenient in the design of code-handling apparatus to consider the requirements therefor in terms of the shortest period of time allowed by the overall system for the proper operation of the system, the description of the invention will be based on the theoretical time period of the basic time element of the code under consideration, which time element will be referred to hereinafter as the B. T. E. A time interval of 2 B. T. E. duration in the aggregate channel assignment represents an inter-character space, while a time interval of 6 or more B. T. E. represents a word space. The letters and figures of the Higgitt code, like those of the Morse code, are made up of unequal length code combinations of dots and/or dashes.

The Higgitt multiplex system operates on a two-channel time-division basis, as is graphically represented in Figs 1*a* and 1*b* of the accompanying drawing. Signal elements of one channel are interposed between the signal elements of the other, so that the channel assignment is twice the length of the basic time element. Shown in Fig. 1*a* are the code arrangements for each channel. It is seen that the code arrangements for channel B are those of channel A with mark and space interchanged. From this illustration it is seen that a dot or a dash is indicated by a signal transition at the center of the channel assignment. It is also seen that for any one channel a dot is distinguished from a dash by the sense of the signal transition, that is, whether the transition is from mark to space or from space to mark. Further, it is seen that for a time interval or space, no signal transition occurs at the center of the channel assignment. Because of this arrangement, if both channels are idle, that is, both channels transmitting the space code arrangement, there will still be reversals in the aggregate time division signal, which are utilized advantageously to hold the receiver in phase with the incoming signal without requiring special synchronizing signals. The aggregate time division signal, showing the interleaving of the two channels, is shown in Fig. 1*b*.

The receivers presently used for receiving Higgitt code signals are electromechanical devices in which the aggregate signal is applied to a mechanical commutator which serves to perform the channelizing. The channelized signal is further commutated in such a way that output can occur only during the central portion of each channel assignment time. By differentiating any output signal, pulses of opposite polarity are obtained for dot and dash, while no output is obtained for time space. The pulses so obtained operate a polar relay which in turn operates a dot or dash relay depending on the pulse polarity. The dot or dash relays when operated close a holding circuit, which is broken by the commutator at a later time. In this way, the dot and dash output pulses are longer than the short pulses obtained by differentiating the signal transitions.

The electromechanical receiver of the prior art has several serious disadvantages. It is expensive to manufacture and requires a large amount of mechanical maintenance in making mechanical adjustments, cleaning of contacts and so forth.

A second disadvantage is found in the timing of the start of the output dots and dashes. The aggregate signal shown in Fig. 1*b* is a perfect aggregate signal. Such a signal could be obtained only by receiving from a perfect transmitter over a distortionless circuit. Since the transmitter keying system is an electromechanical process, certain timing variations are possible. However, when the transmission is over a long radio circuit, the multipath effects will, at times, cause relatively large variations. In the electromechanical receiver, the starts of the output dots and dashes are controlled by the timing of the signal transitions, and hence contain all the timing variations mentioned above. If the variation in the timing of the start of dot or dash outputs becomes large enough, the printers or the translators will no longer operate properly. The present electromechanical Higgitt receiver does not repeat or regenerate the mark and space signals directly, but rather observes only the direction of transitions, i. e., from marking to spacing or from spacing to marking and produces dots or dashes according to the direction of the transition. Any transition occurring within the center-half of the channel assignment, and of sufficient duration to operate the signal relay, is accepted as legitimate. Consequently, noise and multipath can produce false dots and dashes or vary the time of start of dots and dashes. This is an undesirable condition when dealing with automatic equipment.

It is an object of the invention to provide an all-electronic receiver which will accept incoming opposite polarity or two-condition signals, rectify the signals and deliver the rectified signals to a utilization device over separate dot and dash lines, properly timed with respect to each other and of the same polarity.

It is another object of the invention to provide an all-electronic Higgitt code receiver having essentially no variability in the timing of the start of dot or dash outputs.

It is a further object of the invention to develop an all-electronic receiver for operation on double-current signals whether the speed of transmission be at a slow rate or at a fast rate or whether it be variable in character due to electrical and/or mechanical disturbances occurring in the transmission path.

These and other objects of the invention which will appear as the specification progresses are attained in a circuit arrangement comprising phase shifting, trigger, limiting, integrating, detecting and keying circuits in such array as to accept thresholded and limited keyed D.-C. signals corresponding to the aggregate multiplex signals expressed in Higgitt or modified cable current code, integrate the mark signal against time, regenerate a substantially perfect aggregate signal, channelize the aggregate signal and further separate the dot-and-dash elements in each channel for application to a desired utilization device. By means of a standard frequency signal, the receiver according to the invention is made to develop correction pulses required as determined by means of phase detection components included in the array to deliver corrected standard frequency timing waves to synchronize the foregoing operations with the operations at the transmitter.

The electronic receiver described herein first regenerates the individual mark and space elements into perfectly-formed, perfectly-timed signals, and then in effect interprets these signals to determine dots and dashes. Further, the regeneration is not performed on the kicker basis, but rather by integrating the marking and spacing time in each B. T. E. and then repeating either mark or space according to which condition predominated in the B. T. E. Therefore, it is anticipated that fewer erroneous dots and dashes will be produced, and that their timing will be uniform and independent of the exact time of transition in the incoming signal. Greater tolerance in the operating range of automatic equipment should be realized.

The invention will be described in greater detail with reference to the accompanying drawing forming a part of the specification and in which:

Fig. 2 is a functional diagram of a receiver according to the invention;

Figure 3D:
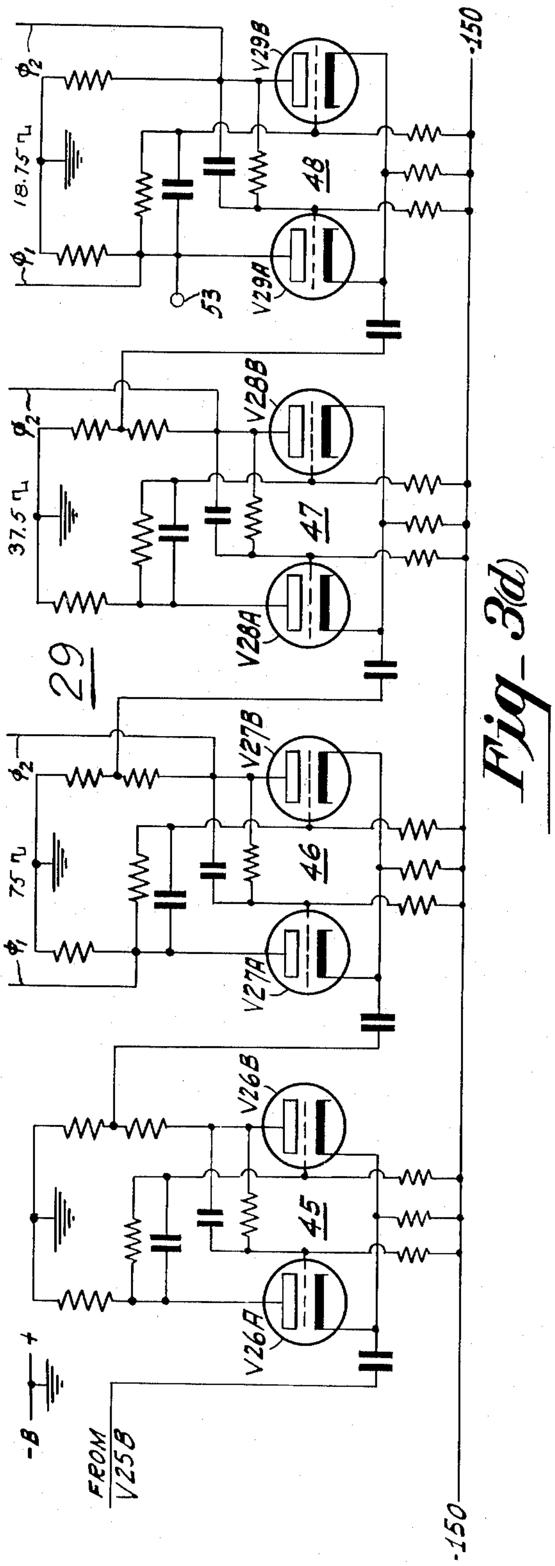
Figure 3A:
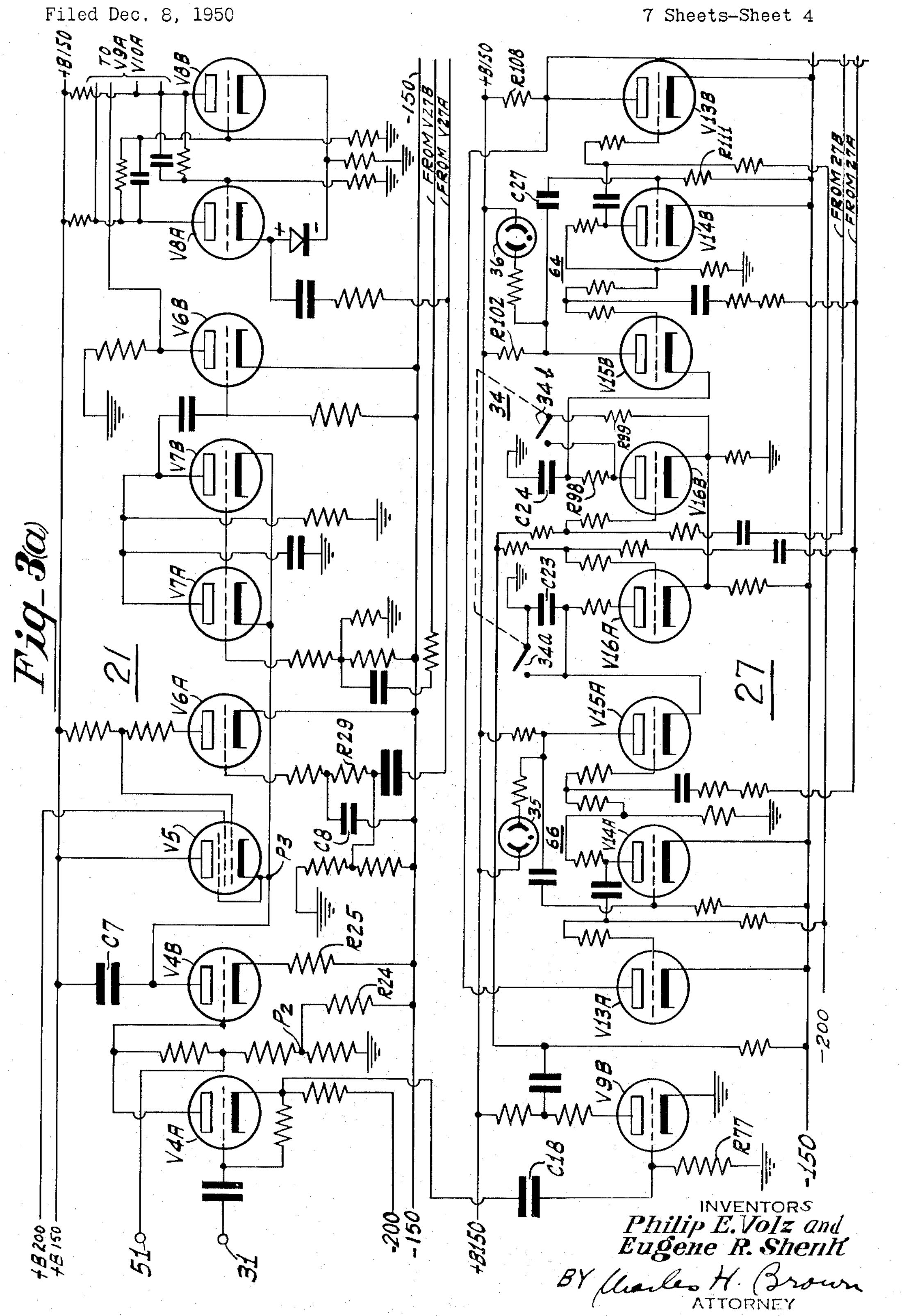

Fig. 3 (Figs. 3(*a*), 3(*b*), 3(*c*) and 3(*d*) being taken together) is a schematic diagram of the receiver illustrated in Fig. 2; and Figs. 4, 5, 6 and 7 are graphical representations of various wave forms occurring at pertinent points in the receiver according to the invention.

A functional diagram of a complete receiver according to the invention is shown in Fig. 2. The functions of each component part of the receiver are briefly described below.

*Input circuitry*

The keyed D.-C. aggregate multiplex signal and timing waves are applied to an integrating mark-space detector and regenerator 21. The actual signal presented to the receiver may either be a keyed D.-C. signal from some external source or the output of a tone signal converter. The keyed tone aggregate multiplex signal is first applied to the tone signal converter and converted into a thresholded and limited keyed D.-C. signal. A control is included to allow setting the thresholding and limiting level relative to the signal level. An example of such a tone signal converter may be had by reference to copending application Ser. No. 155,233, filed April 11, 1950, now Patent No. 2,678,387. The detector circuit integrates mark signal versus time. The duration of each integrating period is governed by the timing wave input and is equal to the duration of one perfect aggregate basic time unit or B. T. E. As a result of the unit-by-unit integration, a perfect, or 50–50 weight, aggregate signal is regenerated.

The regenerated aggregate signal from mark-space detector 21 and a number of timing waves are applied to a channelizer dot-dash detector and output keyer stage 23. By means of coincidence circuits, the signal is both channelized and separated into dots and dashes in each channel. Each channel output consists of two leads; one for dots and one for dashes. These dot and dash outputs may be used through a suitable keyer to operate some types of telegraph printers directly or to operate translators for translating to other codes or other types of printers.

A standard frequency signal, and correction pulses from a phase detector 27 are applied to an amplifier, clipper and phase shifter stage 25. The output from stage 24 is a square wave of standard frequency, except during phase shifting, or correction, periods, during which times one or more of the normal square wave transitions are omitted and two transitions due to the correction pulses are injected in accordance with the information contained in the correction pulse inputs. The net effect of this output voltage is to produce in a frequency divider circuit a square wave of nominally the standard frequency but controlled in phase by the information from phase detector 27.

The aggregate keyed D.-C. signal which has been limited and thresholded in the mark-space detector and timing waves are applied to the phase detector 27. Start of mark pulses are generated from the aggregate signal, and the phase of these pulses with respect to the timing waves is measured. This information, phase error, is integrated over a number of B. T. E. and when a phase correction is required, an output pulse of proper length is generated and supplied to the phase shifter 25.

A wave of corrected standard frequency is applied to a frequency divider chain 29 and by means of binary dividers, all the necessary correct frequency timing waves are produced.

The aggregate signal from the output of the mark-space detector 21 is presented on a signal monitor oscilloscope on a sweep controlled by the local timing wave. The presentation is useful for observing the results of varying the threshold adjustment, and when phasing. It is not, however, necessary to the functioning of the receiver, since an external oscilloscope could be used instead, when making adjustments.

*Mark-space detector*

In practice, an arrangement of terminals is provided so that either the keyed D.-C. signal output of a tone signal converter, or a keyed D.-C. signal from an external source may be connected to the signal input of the mark-space detector 21.

Figure 4:
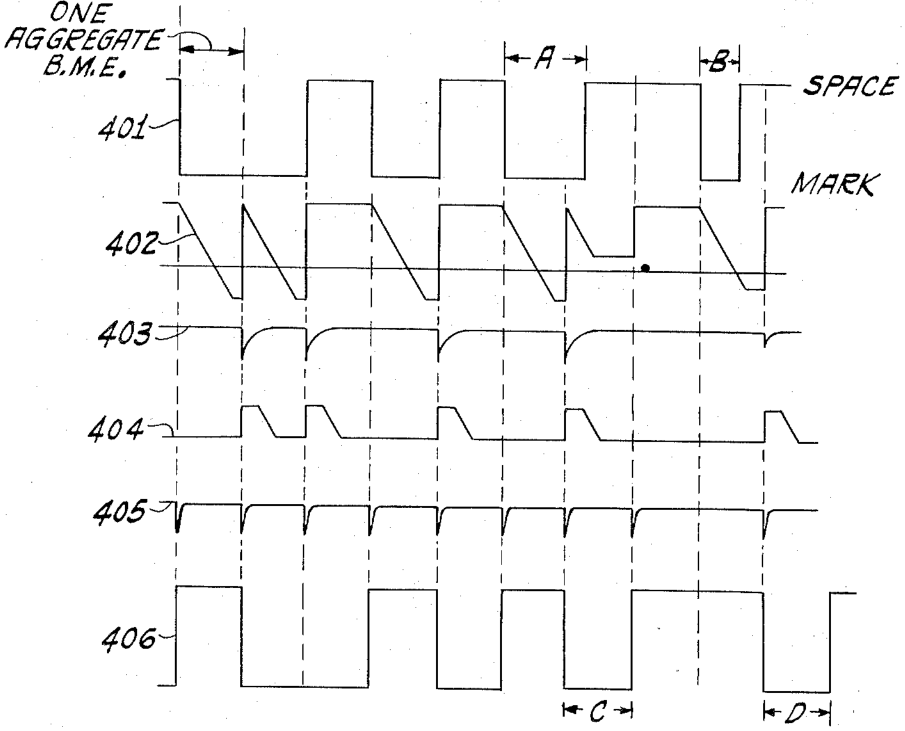

The circuit of the mark-space detector is more fully described in copending U. S. application Ser. No. 106,998, filed June 27, 1949, by L. I. Goldfischer, now Patent No. 2,606,975. The keyed D.-C. aggregate multiplex signal is applied between terminal 31 and ground. When the signal element is spacing, tube V4A is conducting and tube V4B is blocked. When the signal element is marking, tube V4A is blocked and tube V4B is conducting. The voltage of point P2 is positive with respect to the negative cathode supply voltage of tube V4B. Due to the large amount of degenerative feedback obtained across resistor R25, and the constant input voltage across resistor R24, the anode current of tube V4B is essentially constant on a marking signal element. The constant anode current of tube V4B causes capacitor C7 to charge linearly with time. Tube V6A is normally conducting in which condition tube V5 is blocked, except when point P3 becomes sufficiently negative. If point P3 becomes sufficiently negative, the anode current of tube V4B flows through tube V5, preventing the potential of point P3 from falling below this value. Tubes V7A and V7B are normally held in blocked condition. Two square waves 180 degrees apart in phase obtained from the anodes of tubes V27A and V27B are applied to the grid circuits of tubes V7 and V6A. The period of these waves is equal to the duration of one aggregate B. T. E. At the end of each B. T. E. the wave applied to the grid of tube V7 produces a positive pulse at the grid of tube V7. During this pulse, tube V7 will conduct if point P3 is negative with respect to ground, while if point P3 is zero or positive, tube V7 will not conduct. At the end of each B. T. E. the wave applied to the grid circuit of tube V6A produces a negative pulse, which, after a short time delay produced by resistor R29 and capacitor C8, reaches the grid and blocks tube V6A. This tube then is held in blocked condition for a short time during which tube V5 (which is not conducting) discharges capacitor C7. In this manner, at the end of each B. T. E., tube V7 produces an output pulse if mark has endured long enough to cause point P3 to become negative, and then capacitor C7 is discharged. Following these two short periods, one to sample and one to discharge, the circuit is ready to integrate the mark time of the succeeding B. T. E. At the end of each mark element (a mark element containing more than a predetermined percentage of mark) a negative pulse is produced at the anode of tube V7, while no output pulse is produced at the end of space elements. The mark pulses so produced are amplified and shaped by tubes V6B and V9A. Tube V9A is normally blocked, but a mark pulse allows conduction for a portion of one B. T. E. Tubes V8A and V8B comprise a trigger circuit or bistable multivibrator circuit to which trigger pulses from two sources are applied. One source is the mark pulses from tube V9A, while the other source is synthetic space pulses from the same square wave applied to the grid circuit of tube V6A. At the end of each B. T. E., a negative pulse appears at the cathode of tube V8A, and if no mark pulse appears at the grid of tube V9A, this negative pulse causes tube V8A to conduct, which in turn blocks tube V8B. If tube V8A was already conducting, the negative pulse has no effect. If a mark pulse appears at the grid of tube V9A, tube V8B will always conduct and in turn tube V8A will be blocked. The reason that the mark pulse causes tube V8B to conduct even though the space pulse appears simultaneously, is that the mark pulse is much wider than the space pulse. Due to this action of the mark and space pulses, the trigger circuit, formed by tubes V8A and V8B, regenerates the aggregate multiplex signal. However, since the timing of these pulses is synchronous with the local square wave, the regenerated signal is perfectly timed and of 50–50 weight. Fig. 4 shows the wave forms in the mark-space detector. Curve 401 represents the aggregate input signal; curve 402 the voltage between point P3 and ground; curve 403 the mark pulse output of tube V7; curve 404 the grid voltage of tube V9A (shaped mark pulses); curve 405 the voltage at the cathode of tube V8A (space pulses); and curve 406 represents the regenerated multiplex signal at the anode of tube V8B. The input signal is purposely shown distorted in line 401 with a longer-than-normal mark at A, and a shorter-than-normal mark at B. It is seen that the regenerated output signal is not distorted, but rather contains two perfect marks as shown in line 406 at C and D.

*Channelizer*

Figure 3B:
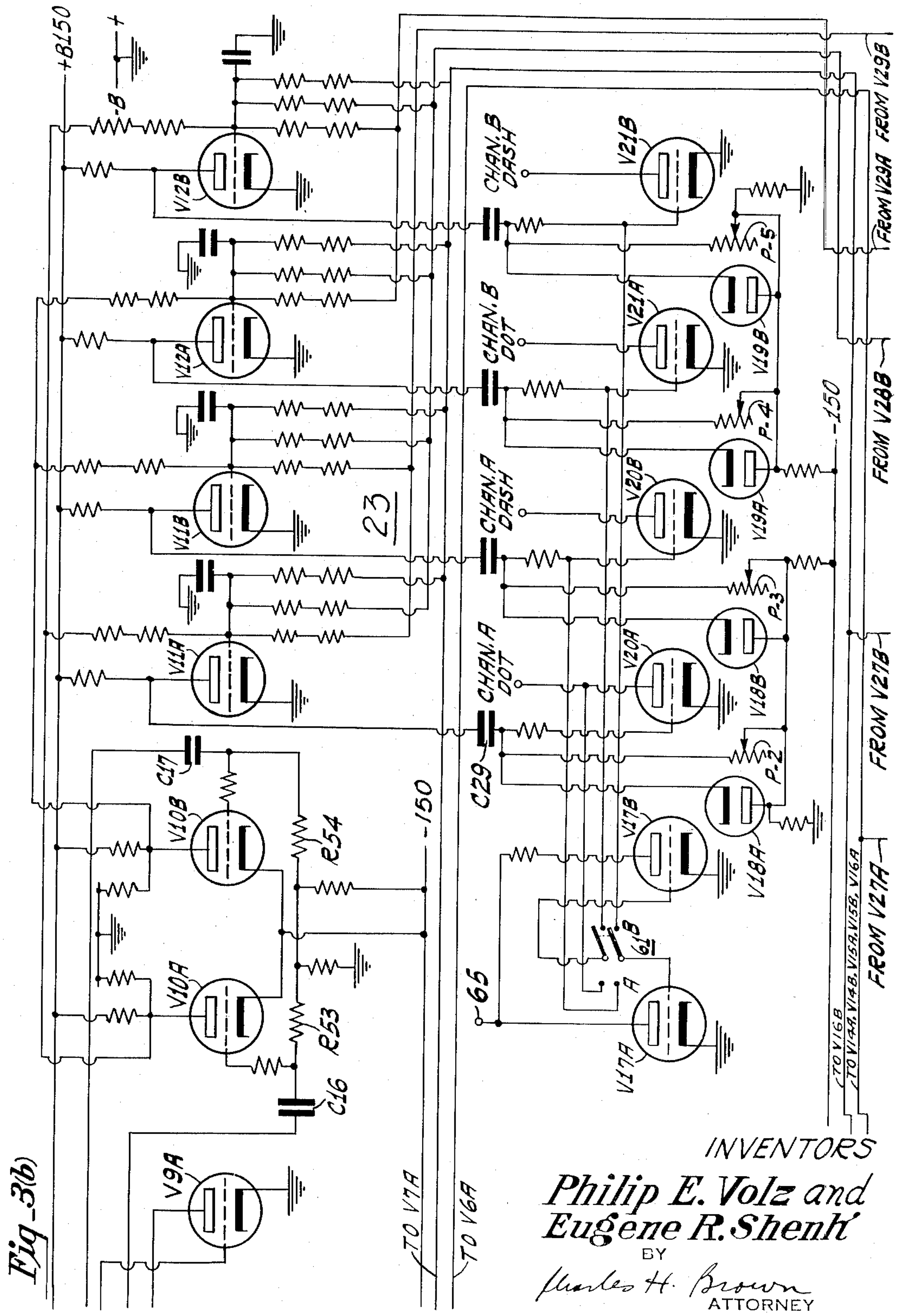

Both phases of the regenerated aggregate signal are utilized in the channelizer, dot-dash detector and output keyer shown in Fig. 3(b), one phase being connected to the grid circuit of tube V10A and the other to the grid circuit of tube V10B. The grid returns of tube V10 are made to a positive bias voltage, that is, the grids are less negative than the cathodes. The regenerated signals are differentiated in the R–C circuit formed by capacitor C17, resistor R54, and capacitor C16, resistor R53. The positive grid pulses so obtained will not cause any change in the output of tube V10A and V10B. The negative pulses will block tubes V10A and V10B and result in a positive pulse at the anodes. Since the grids of tubes V10A and V10B are fed with both phases of signal voltage, every signal transition will result in a positive output pulse from either tube V10A or tube V10B. If the transition is from space to mark, an output pulse will be produced by tube V10A, while if the transition is from mark to space, an output pulse will be produced by tube V10B. In this manner, the signal transitions are separated by tubes V10A and V10B according to their sense. However, it is the sense of a transition together with its time of occurrence relative to channel assignment times that determines its code assignment.

Figure 1A:
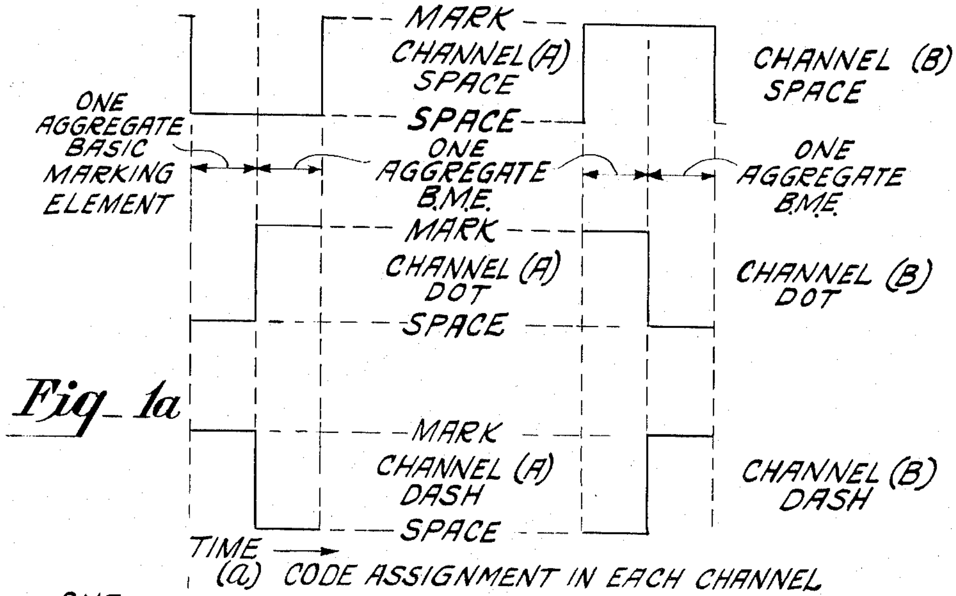
Fig. 1 is a graphical representation of a Higgitt or modified double-current cable code, Fig. 1*a* being a representation of the elements as present in each communication channel and Fig. 1*b* being a representation of such elements combined into an aggregate signal.
Figure 1B:
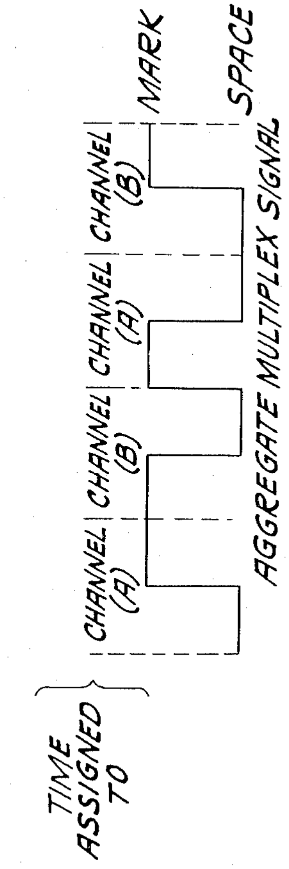
Figure 5:
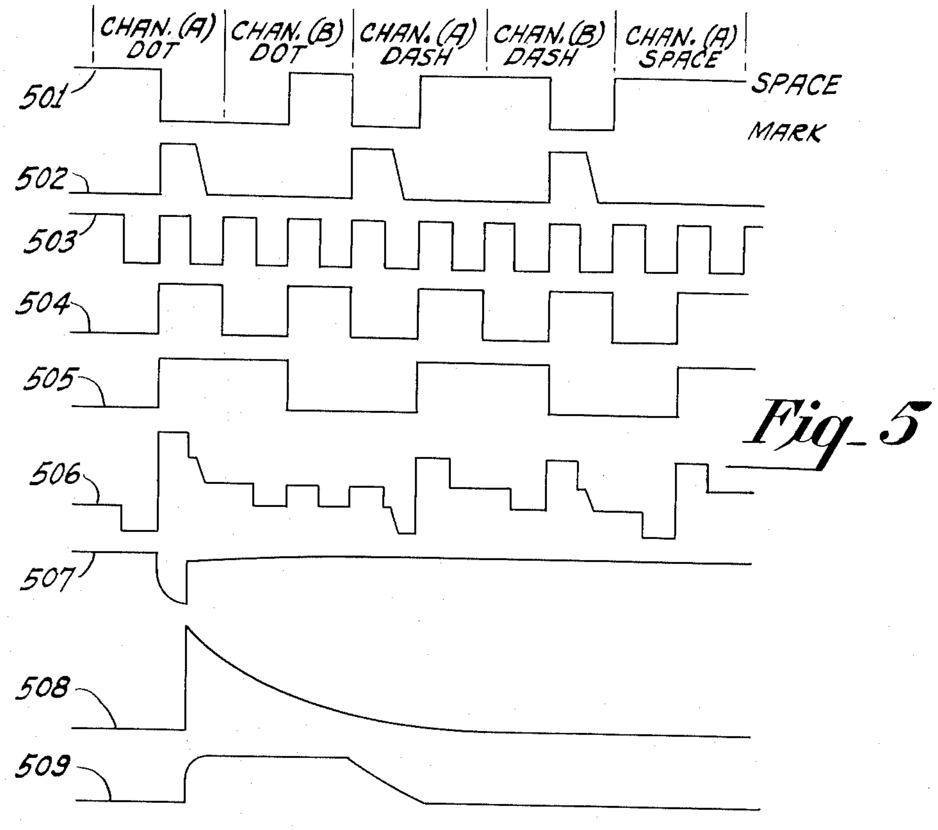

Referring back to Fig. 1, it is seen that only those signal transitions occurring at the center of a channel assignment have any significance. The two pulse trains produced by tubes V10A and V10B (one pulse train for space-to-mark transitions and one pulse train for mark-to-space transitions) are next compared for relative timing and only those pulses which were produced by a transition at the center of a channel assignment produce any output. For purposes of explaining the time-comparing circuits and output circuits, only those associated with channel A dot output will be used, it being understood that application of the timing waves and the pulse trains permutation-wise to the other coincidence tube circuits described results in similar operation for other channels and/or signal elements. The other output circuits differ only in the signal transition sense, or in channel designation. Three timing waves obtained from the frequency divider chain 29 are applied to the grid circuit of tube V11A, of the channelizer shown in Fig. 3(*b*). The highest frequency wave has a period equal to the duration of an aggregate B. T. E. The other two timing waves are one-half and one-quarter of this frequency. Each timing wave voltage is negative with respect to ground on its negative half-cycle. The fourth input voltage applied to the grid circuit of tube V11A is the pulse train from tube V10A. This voltage is normally negative but during a pulse becomes positive. The result of mixing the four voltages in the grid circuit of tube V11A is to keep tube V11A blocked except for one condition. The one condition is met when a positive pulse is received from tube V10A and all three timing waves are on the positive half of the cycle. The timing waves are simultaneously on the positive half-cycle for a half of an aggregate B. T. E. immediately following the center of the channel A assignment. Therefore, tube V11A could only possibly conduct during these short periods, once during each channel A assignment. Tube V11A will conduct if a pulse is received at this time from tube V10A. Activation of tube V11A in turn causes capacitor C29 to be charged through diode V18A of the dot-dash detector. After half an aggregate B. T. E. tube V11A is again blocked and as a result capacitor C29 is discharged through the grid circuit of tube V20A, the duration of discharge being controlled by the setting of potentiometer P–2. Tube V20A therefore is conducting for a period of time, whenever a dot is received in the channel A assignment. The pulse of current through tube V20A is used to energize the utilization device (not shown) which may be a translater—one, for example, of the type disclosed in copending application Ser. No. 124,318 filed October 29, 1949, now Patent 2,534,388—or a cable code telegraph printer; the latter being connected through a suitable keyer. In this manner, the aggregate multiplex signal is separated into two single channels, each of which is separated into its respective dot and dash outputs. The waveforms in the channelizer, dot-dash detector and output keyer for channel A dot are shown in Fig. 5. Curve 501 represents the regenerated aggregate multiplex signal; 502 the pulse train at the anode of tube V10A (a pulse being produced for each space-to-mark transition); 503, 504 and 505 the three timing waves from the frequency divider chain 29; 506 the grid voltage of tube V11A (resulting from the mixing of the waveforms of 502, 503, 504 and 505); 507 the pulse appearing at the anode of tube V11A; 508 the positive ex-potential pulse in the grid circuit of tube V20A, and 509 represents the current pulse through the V20A, which is generated each time a dot is received in channel A. Similar waveforms will be obtained for the other channels, the difference being in the phase of timing waves applied.

*Phase detector*

Coarse adjustment of the phase relationship between the incoming signal wave train and the timing waves is made initially by operation of a manual control, and the fine phase adjustment is made automatically by an electronic phase shifting circuit and phase detector. Conveniently, the coarse adjustment can be made by forcing the fine phase adjusting circuit and is therefore described more clearly after the description of the electronic circuit has been completed. Essentially, detection of the phase relationship according to the invention is made by comparing the amounts of time which occur before and after the transitions in the timing wave of the pulses generated at the start of each mark.

The aggregate multiplex signal (which has been further thresholded by action of tube V4A in the mark-space detector) is differentiated in the grid circuit of tube V9B of phase detector 27 shown in Fig. 3(*a*). In the aggregate signal, space-to-mark is a negative transition while mark-to-space is a positive transition. Since tube V9B is normally conducting with its grid at cathode potential, a positive grid pulse (occurring at the end of each mark) will result in no output, while a negative grid pulse (occurring at the start of each mark) causes a positive pulse to appear at the anode of tube V9B. The duration of these start-of-mark pulses depends on the time constant of resistor R77 and capacitor C18, and the normal duration is small compared to the duration of an aggregate B. T. E. The start-of-mark pulses are fed to the grid circuits of tubes V16A and V16B. In addition, the grids of tubes V16A and V16B are driven by two phases of the local timing wave whose period is equal to the duration of one aggregate B. T. E. The tubes V16A and V16B are normally blocked and the grid bias is such that the timing waves alone cannot cause them to conduct. Only when the start-of-mark pulse is coincident with the positive half-cycle of the timing wave can the tube conduct. In normal operation a portion of the start-of-mark pulse is coincident with the positive half-cycle of timing voltage on the grid of tube V16A, and the remaining portion of the start-of-mark pulse is coincident with the positive half-cycle of timing voltage on the grid of tube V16B; the entire circuit functioning to maintain the transition in the local timing wave at the center of the start-of-mark pulse. The result is to correct the phase of the local timing wave to be in phase with the signal starts of marks. The portion of the start-of-mark pulse coincident with the positive half-cycle of timing voltage at the grid of tube V16B causes this tube to conduct. The pulses of anode current in tube V16B cause capacitor C24 to be charged, the magnitude of the anode current and hence the charging rate being controlled by resistor R98. A trigger circuit 64 of the single shot or monostable multivibrator type comprising tubes V15B and V14B is coupled to the anode circuit of tube V16B and tube V14B is normally conducting. Tube V15B is blocked by applying negative grid bias obtained from tube V14B. The cathode of tube V15B is connected to capacitor C24 which is charging in the negative direction. When the cathode of tube V15B becomes sufficiently negative, the multivibrator 64 will fire. However, for reasons explained later, it is necessary that circuit 64 operate at a known time, for instance synchronous with the local timing wave. In order to secure this result, the local timing wave is differentiated and the pulses so formed are injected into the grid circuit of tube V15B. The amplitude of the pulses is larger than the steps of voltage occurring across capacitor C24. Therefore, the multivibrator 64 will operate on a synchronizing pulse, but only when capacitor C24 has been charged sufficiently negative. When circuit 64 operates, tube V14B is blocked and tube V15B is clamped on its diode line. Capacitor C24 is discharged through tube V15B raising the cathode of tube V15B in a positive direction. As the cathode of tube V15B is raised above ground, the resultant cathode bias causes tube V15B to block and tube V14B to conduct. The time constant of capacitor C27 and resistor R111 is made much longer than the time required for the cathode of tube V15B to reach ground. Therefore, the active trigger time is controlled by the time constant of capacitor C24, resistor R102 and the diode line resistance of tube V15B. Since the diode line resistance is small compared to that of resistor R102, the active trigger time is practically independent of tube characteristics. During the active trigger time, the anode of tube V14B is at ground potential and a positive pulse of this duration is coupled to the grid of tube V13B. Tube V13B is normally blocked, but when the positive trigger pulse is applied to the grid circuit, tube V13B conducts and a negative pulse is generated at the anode. Resistor R108 is a load resistor common to both tubes V13A and V13B. From the trigger or monostable multivibrator circuit 66 comprised of tube V14A and V15A, potential is applied to grid of the tube V13A. 'Circuit 66 is actuated by the charging of capacitor C23 which is accomplished by causing tube V16A to conduct. The timing wave applied to the grid of tube V16A is 180 degrees out-of-phase with that applied to the grid of tube V16B. If the start-of-mark pulses produce anode current pulses only in tube V16B, the local phase should be retarded, while if anode current is produced only in tube V16A, the local phase should be advanced. The correction pulses (both advance and retard) produced as a result of the phase detection appear across resistor R108. The retard correction pulse is longer than the advance correction pulse. A correction pulse is produced only after the information from a number of B. T. E. is integrated by the action of the resistors and capacitors in the anode circuits of tubes V16A and V16B. The whole circuit operates so that it hunts about the position where the timing wave transitions are centered on the start-of-mark pulses. The rate of hunting is determined by the amount of integration and the frequency of occurrence of the start-of-mark pulses.

When capacitor C23 is discharged, capacitor C24 will usually be charged to the same extent and conversely. Provision could be made for simultaneous discharge of these capacitors, but it has been found that such is entirely unnecessary. Very little difference in operation, if any, is had by employing circuitry effective to discharge the complementary capacitor. On the other hand not only a saving of component parts is effected, but a slight increase in the hunting action may occur, which effect is considered beneficial rather than detrimental.

While as stated above, capacitors C23 and C24 will seldom discharge at the same time, should they do so, the longer, retard, pulse will govern the action of the controlled circuits. In the overall operation of the circuit, an occasional tendency to correct in the wrong direction will not prove detrimental.

Figure 6:
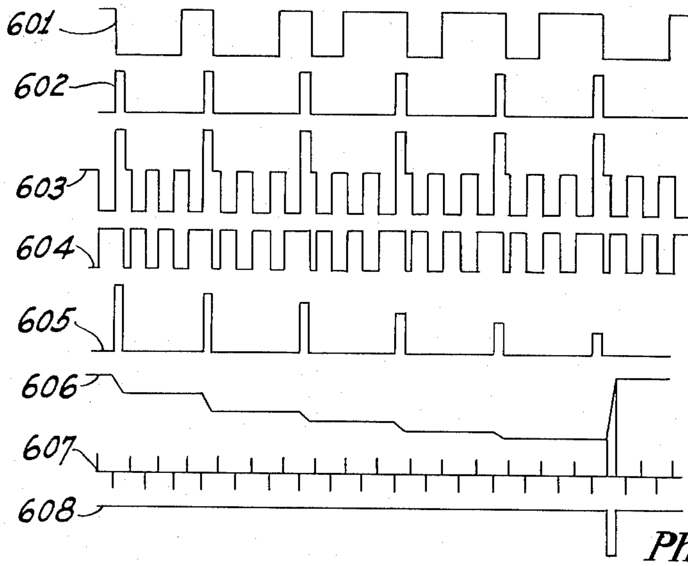

A manually operated phasing switch 34 is included in the circuit for insuring that each channel element output of channelizer 23 appears at the terminal which is connected to the corresponding input line of the utilization device; that is channel A dot output appears at the anode of tube V20A and so on. One section, 34*a* of the phasing switch 34, shorts capacitor C23, while the other section, 34*b*, connects a resistor R99 between anode and cathode of tube V16B. The result of shorting capacitor C23 is to prevent advance trigger circuit 66 comprising tubes V14A and V15A from firing, while capacitor C24 is charged continuously through resistor R99, which causes retard trigger 64 comprising tubes V14B and V15B to fire periodically. Therefore, as long as phasing switch 34 is closed, the phase of the local timing waves will be continuously retarded. Switch 34 is used to force the phase of the local timing waves to approximately the correct phase with respect to the multiplex signal, after which phase detector 27 automatically maintains the correct phase relationship. Neon lamps 35 and 36 are provided to indicate the phase relationship to the extent of indicating the firing of the correcting circuit and whether the phase is being advanced or retarded. When the idle time signals are being received, the proper phase relationship is established holding switch 34 closed, in which condition lamp 35 is extinguished, and lamp 36 flashes continuously. About sixteen flashes of lamp 36 should be counted, after which the phase relationship will be roughly shifted one position and phase detector 27 will be able to establish the exact phase relationship. Not more than three operations of switch 34 are ever required. If message signals are being received, lamps 35 and 36 are not positive indicators of phase relationship, but observation of the printers will provide the necessary information. This initial forcing of the local phase may be necessary, since only one out of four possible locked-in-phase conditions is the correct one. The waveforms appearing in the phase detector are shown in Fig. 6. Curve 601 represents the thresholded aggregate signal from tube V4A in the mark-space detector; 602 the start-of-mark pulse train at the anode of tube V9B; 603 the grid voltage of tube V16B; 604 the grid voltage of tube V16A; 605 the anode current of tube V16B; 606 the voltage between the cathode of tube V15B and ground; 607 the grid voltage of tube V15B; and curve 608 represents the retard correction pulse appearing across resistor R108 at the output of the phase detector 27.

*Phase shifter*

Figure 7:
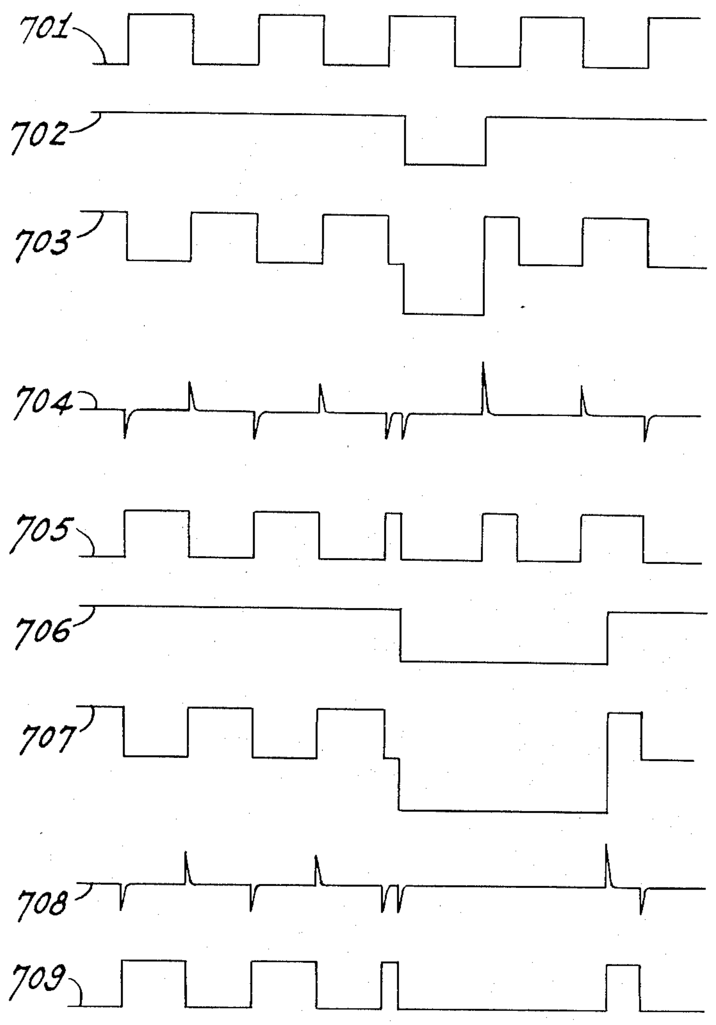

The principles employed in the phase shifting portion of amplifier, clipper and phase shifter circuit 25 are explained in detail in copending U. S. application Ser. No. 212,269, filed February 23, 1951, by J. J. Coughlin, now Patent No. 2,617,932, thereafter reissued as Re. 23,932. A standard frequency input voltage is applied to terminals 37 and 38 and as shown in Fig. 3 (*c*) coupled by means of transformer T2 to the grid of tube V22A. With small amplitudes of standard frequency voltage, tube V22A will function as a class A amplifier, while with larger voltage amplitudes, limiting and clipping action is obtained; limiting by the action of grid current and series resistor R122, and clipping by becoming blocked during the negative half-cycle of grid voltage. Over a certain range of input voltage amplitudes, the output at the anode of tube V22A varies from a sinusoidal wave to a nearly square wave. Regardless of the exact waveshape of the standard frequency voltage at the anode of tube V22A, the amplitude is large compared to the cutoff voltage of tube V22B. Therefore, tube V22B is conducting on positive half-cycles of grid circuit voltage, and is blocked on negative half-cycles. The anodes of tubes V22B and V23A are connected together, and when tube V22B is conducting, both anodes are negative with respect to ground since the cathodes are at −150 volts, when tube V22B is blocked, the anode of tube V23A is positive with respect to ground, because the anodes are connected to the positive supply through resistor R124. When the anode of tube V23A is negative—tube V22B conducting—no anode current can flow, but grid current flows through resistors R128 of phase shifter 25 and resistor R108 of phase detector 27. This results in developing a certain value of voltage between the cathode of tube V23A and ground. When tube V22B is blocked, both anode and grid currents flow in tube V23A and result in developing a larger value of voltage between the cathode of tube V23A and ground. In the absence of correction pulses, therefore, the cathode voltage of tube V23A is a square wave of standard frequency with its A.–C. axis above ground potential. This square wave is coupled to the grid of tube V23B which is connected as a cathode follower. The use of the cathode follower allows driving a low impedance load, which consists of the first stage in the frequency divider chain. The output of tube V23B is coupled by capacitor C35 to the first trigger circuit or bistable multivibrator circuit 42 of divider chain 29. The transitions in the square wave at the cathode of tube V23B produce pulses at the cathode of tubes V24A and V24B of the trigger circuit, due to differentiation in capacitor C35 and the resistors associated therewith. Circuit 42 is so adjusted that every input pulse regardless of the polarity of the pulse will cause the multivibrator to operate and, except during phase shifting periods, the output of circuit 42 is a square wave of standard frequency applied to the input transformer T2. During a correction pulse, the anodes of tubes V13A and V13B, and hence the grid of tube V23A, become sufficiently negative to block tube V23A. When tube V23A is blocked, its cathode voltage is reduced to ground potential. At the end of the correction pulse, tube V13 is again blocked and the cathode of tube V23A is raised to the normal value under control of the standard frequency input. The effect of the correction pulse is to produce a new level (zero potential) at the cathode of tube V23A, which normally varies as a square wave between two higher D.–C. levels. This results in adding a transition to the cathode voltage wave of tube V23A at the beginning and at the end of the correction pulse. However, over the duration of the correction pulse, any transitions which would normally appear due to the standard frequency are removed since tube V23A is blocked. Therefore, depending on the duration of the correction pulse, the number of transitions can be made greater or less than normal, and the net result will be a phase shift in the output of the following trigger circuit. The correction pulse starts shortly after a standard frequency transition. The duration of the advance correction pulse is such that it will cause one normal transition to be blanked. Since the correction pulse itself adds two transitions, the net result is the addition of one transition. The output of circuit 42 is thus caused to advance in phase by 180 degrees. The retard correction pulse blanks three normal transitions, resulting in a net subtraction of one transition. The output of trigger circuit 42 is thus caused to retard by 180 degrees. The equivalent time shift of each retard or advance step is one-half the period of the standard frequency. The waveforms appearing in the phase shifter together with the resulting phase-shifted output of the first trigger circuit are shown in Fig. 7. Curve 701 represents the grid voltage of tube V22B (shown as a square wave); 702 shows an advance correction pulse; curve 703 the cathode voltage of V23A; 704 the pulse train fed to the trigger circuit; and curve 705 represents the output of the trigger circuit showing the resultant 180 degree advance in phase. Curve 706 illustrates an example of a retard correction pulse; 707 the cathode voltage of tube V23A; 708 the pulse train; and 709 represents the trigger output showing the resultant 180° retard in phase.

*Timing wave generator*

Frequency divider chain 29 is shown schematically in Figs. 3(*c*) and (*d*). The chain consists of one stage 42 which divides by one, and five stages 44–48 each of which divides by two. Each stage except the first consists of a trigger circuit or bistable multivibrator circuit adjusted to be actuated only by positive input pulses. The divider chain provides all of the necessary timing waves used by the rest of the circuits, and is conventional in all respects other than those mentioned.

*Monitor*

While the receiver according to the invention may be phased properly by operation of the phasing switch described above and observing the effect of such operation at a printer or other component, a signal monitor 56 is preferably connected as shown in Fig. 2. Monitor 56 is preferably constituted by a cathode ray tube and associated wave-shaping and amplifier circuits which display some indication of the phase relationship between the dot and dash elements of the two channels. A saw-tooth sweep voltage is developed by charging a capacitor and discharging the same through a normally blocked triode vacuum tube which is rendered conductive once every other channel assignment by means of a pulse derived in a differentiation circuit having the input connected to terminal 53 of the frequency divider chain 29. The resulting saw-tooth voltage is amplified and applied to the horizontal deflection plates of the cathode ray tube. The thresholded aggregate signal from terminal 51 of the mark-space detector is applied to the vertical deflection plates of the cathode ray tube. The resultant display on the cathode ray tube shows 4 aggregate B. T. E. of the thresholded aggregate signal; two for channel A and two for channel B. This picture is referred to when setting the threshold adjustment and when phasing the receiver to a signal.

*Appendix*

The following component parts values were used in construction of an electronic Higgitt code receiver as shown in Fig. 3 and mentioned in the foregoing specification and are given by way of example only:

CAPACITORS

| Reference number | | Value |
|---|---|---|
| C7 | μf | 0.026 |
| C8 | pf | 250.0 |
| C16 | μf | 0.01 |
| C17 | μf | 0.01 |
| C18 | pf | 500.0 |
| C23 | μf | 0.05 |
| C24 | μf | 0.05 |
| C27 | μf | 0.01 |
| C29 | μf | 0.02 |
| C35 | μf | 0.002 |

RESISTORS

| Reference number: | | Value |
|---|---|---|
| P2 | megohms | 1.0 |
| R24 | kilohms | 68.0 |
| R25 | do | 150.0 |
| R29 | megohms | 1.0 |
| R53 | kilohms | 430.0 |
| R54 | do | 430.0 |
| R77 | megohms | 1.0 |
| R98 | kilohms | 560.0 |
| R99 | megohms | 10.0 |
| R102 | kilohms | 220.0 |
| R108 | do | 120.0 |
| R111 | megohms | 1.0 |
| R122 | kilohms | 100.0 |
| R124 | do | 68.0 |
| R128 | do | 56.0 |

TUBES

| Reference number: | RMA type |
|---|---|
| V4A—V4B | 6SL7 |
| V5 | 6V6 |
| V6A—V6B | 6SL7 |
| V7A—V7B | 6SN7 |
| V8A—V8B | 6SN7 |
| V9A—V9B | 6SL7 |
| V10A—V10B | 6SL7 |
| V11A—V11B | 6SL7 |
| V12A—V12B | 6SL7 |
| V13A—V13B | 6SL7 |
| V14A—V14B | 6SN7 |
| V15A—V15B | 6SN7 |
| V16A—V16B | 6SL7 |
| V17A—V17B | 6SN7 |
| V18A—V18B | 6H6 |
| V19A—V19B | 6H6 |
| V20A—V20B | 6SN7 |
| V21A—V21B | 6SN7 |
| V22A—V22B | 6SL7 |
| V23A—V23B | 6SN7 |
| V24A—V24B | 6SN7 |
| V25A—V25B | 6SN7 |
| V26A—V26B | 6SN7 |
| V27A—V27B | 6SN7 |
| V28A—V28B | 6SN7 |
| V29A—V29B | 6SN7 |

NEON LAMPS

| | |
|---|---|
| 35 | NE–51 |
| 36 | NE–51 |

POWER SUPPLIES

Two power supplies were used. One power supply having its negative terminal at ground, delivered 150 volts D. C. to terminals marked +B. The other power supply having its positive terminal grounded, delivered 150 volts D. C. to terminals marked with the minus (—) sign.

The invention claimed is:

1. An electronic circuit arrangement for separating the constituent signal elements of a multichannel, plural-condition, aggregate telegraph signal train, including an input circuit to which said signal train is applied to produce output signal trains having opposing phase relationship with respect to each other, a timing-wave generator arranged to produce a plurality of harmonically-related timing waves, a phase-detector circuit coupled to said input circuit and said timing-wave generator to determine the phase relationship between said signal train and said timing waves, a phase shifting circuit coupled between said phase detector circuit and said timing wave generator to adjust the output waves of the latter into substantial synchronism with said signal train, a plurality of output circuits one for each category of constituent desired, and an electronic switching circuit coupled between said input circuit and said output circuits and arranged to be actuated by said harmonically-related timing waves to energize the output circuit corresponding to the signal element under consideration.

2. An electronic circuit arrangement for translating recurring two-channel, time-division, two-condition, aggregate code signals into the component channels and elements, including means to differentiate said aggregate code signals, a pair of normally conducting electron discharge structures having cathode, control and anode electrodes, means to apply the differentiated aggregate signals to said electron discharge structures in opposing phase relationship to produce positive output pulses from one of said electron discharge structures depending on the sense of the transitions of said aggregate code signals, further electron disharge systems having cathode, control and anode electrodes, means to apply said positive output pulses to the control electrodes of said electron discharge systems in pairs, means to generate a plurality of timing waves harmonically related to the repetition rate of said aggregate code signals, means to apply said timing waves to the control electrodes of said electron discharge systems in phase relationship to maintain all but one of said electron discharge systems blocked at a given time, said one electron discharge system producing a positive output pulse when the respective element of said aggregate signal is marking.

3. An electronic circuit arrangement for separating the constituent signal elements of a multichannel, plural-condition, aggregate telegraph signal train, including an input circuit to which said signal train is applied to produce output signal trains having opposing phase relationship with respect to each other, a timing-wave generator arranged to produce a plurality of harmonically-related timing waves, a plurality of output circuits one for each category of constituent desired, and an electronic switching circuit coupled between said input circuit and said output circuits and arranged to be actuated by said harmonically-related timing waves to energize only the output circuit corresponding to the signal element under consideration.

4. An electronic circuit arrangement for separating multi-channel, time division, aggregate code signals into the constituent elements thereof, including a mark-space detector and regenerator circuit adapted to regenerate incoming aggregate code signals, a square wave generator circuit adapted for operation in conjunction with a source of standard frequency, a phase detector circuit arranged to determine the phase relationship between the incoming code signals and the output of said square wave generator circuit, a phase shifting circuit coupled to said square wave generator circuit and to said phase detector circuit to produce a corrected square wave output, a frequency divider chain coupled to said square wave generator circuit to produce a plurality of timing waves harmonically related to said corrected square wave, a mark-space transition detector circuit coupled to said regenerator circuit to produce different pulse outputs for each type of transition, and a plurality of coincidence gating circuits to which said pulse outputs and said timing waves are applied, said pulse outputs and said timing waves having phase relationships at which one only of said gating circuits is active for each marking element of said aggregate code signals.

5. An electronic circuit arrangement for separating aggregate Higgitt code signals into the constituent elements thereof, including a mark-space detector and regenerator circuit adapted to regenerate incoming aggregate code signals, a square wave generator circuit adapted for operation in conjunction with a source of standard frequency, a frequency divider chain arranged to produce a plurality of timing waves harmonically related to said standard square wave, a mark-space transition detector circuit coupled to said regenerator circuit to produce different pulse outputs for each type of transition, and a plurality of coincidence gating circuits to which said pulse outputs and said timing waves are applied, said pulse outputs and said timing waves having phase relationships at which one only of said gating circuits is active for each marking element of said aggregate code signals.

6. An electronic circuit arrangement for separating multi-channel, time division aggregate code signals of a received telegraph wave into the constituent elements thereof, including an input circuit to which said received telegraph wave is applied, a timing wave generator circuit coupled to said input circuit to produce a plurality of timing waves harmonically related to said received telegraph wave, a mark-space transition detector circuit coupled to said input circuit to produce different pulse outputs for each type of transition, and a plurality of coincidence gating circuits coupled to said timing wave generator and to said input circuit to receive said pulse outputs and said timing waves, said pulse outputs and said timing waves having phase relationships at which one only of said gating circuits is active for each marking element of said aggregate code signals.

7. An electronic circuit arrangement for translating two-channel, time-division two-condition aggregate code signals into the component channels and elements including means to differentiate the individual elements of said aggregate code signals, a pair of normally conducting electron discharge structures having cathode, control and anode electrodes, means to apply the differentiated aggregate signals to said electron discharge structures in phase opposing relationship to produce positive output pulses from one of said electron discharge structures depending on the sense of the transitions of said aggregate code signals, further electron discharge systems having cathode, control and anode electrodes, means to apply said positive output pulses to the control electrodes of said electron discharge systems in pairs, means to generate a plurality of timing waves harmonically related to the repetition rate of said aggregate code signals, means to permute said timing waves to the control electrodes of said electron discharge systems in phase relationship to maintain all but one of said electron discharge systems blocked at a given time, and a charge storing device coupled to said one electron discharge system to produce a positive output pulse when the respective element of said aggregate signal is marking.

8. In an electronic circuit arrangement for separating the constituent signal elements of a multichannel, plural-condition, aggregate telegraph signal train under control of timing waves, including an input circuit to which said signal train is applied to produce an output signal train, a timing-wave generator arranged to produce a plurality of harmonically-related timing waves, a phase-detector circuit coupled to said input circuit and said timing-wave generator to determine the phase relationship between said signal train and said timing waves, and a phase shifting circuit coupled between said phase detector circuit and said timing wave generator to adjust the output waves of the latter into substantial synchronism with said signal train, said phase shifting circuit comprising means effective to inject additional cycles in said timing wave and to eject cycles of said timing wave in response to the output of said phase detector circuit.

9. An electronic circuit arrangement for separating aggregate Higgitt code signal train into the constituent elements thereof, including an input circuit adapted to receive said signal train and to produce output signal trains of substantially perfect signal form and opposite phase relationship with respect to each other, differentiator circuits coupled to said input circuit individually to receive said output signal trains and to produce in response thereto trains of positive and negative pulses occurring for each transition in said output signal trains, a pair of controlled electron path structures individually connected to said differentiator circuits, said controlled electron path structures being affected by pulses of one polarity only to produce a single output transition pulse at each signal transition, a plurality of controlled electron path devices, said output transition pulses being applied to pairs of said devices, a source of timing waves harmonically related to the period of the received signal train said timing waves being applied to some of said controlled electron path devices in given phase and to the others of said controlled electron path devices in opposite phase to permute the phases between the controlled electron path devices whereby all phases are in positive coincidence in but one of said controlled electron path devices at a time, and a plurality of output circuits individual to said controlled electron path devices for deriving a pulse output in one of said output circuits corresponding to the signal element under consideration.

10. An electronic circuit arrangement for separating aggregate Higgitt code signal train into the constituent elements thereof, including an input circuit adapted to receive said signal train and to produce output signal trains of substantially perfect signal form and opposite phase relationship with respect to each other, differentiator circuits coupled to said input circuit individually to receive said output signal trains and to produce in response thereto trains of positive and negative pulses occurring for each transition in said output signal trains, a pair of controlled electron path structures individually connected to said differentiator circuits, said controlled electron path structures being affected by pulses of one polarity only to produce a single output transition pulse at each signal transition, a plurality of controlled electron path devices, said output transition pulses being applied to pairs of said devices, a source of timing waves harmonically related to the period of the received signal train, said timing waves being applied to some of said controlled electron path devices in given phase and to the others of said controlled electron path devices in opposite phase to permute the phases between the controlled electron path devices whereby all phases are in positive coincidence in but one of said controlled electron path devices at a time, and a plurality of output circuits individual to said controlled electron path devices for deriving a pulse output in one of said output circuits corresponding to the signal element under consideration, said output circuits comprising a charge storing device and a further controlled electron path device.

11. An electronic circuit arrangement for producing an output pulse of energy having a time duration indicative of the phase relationship existing between a received mark-space telegraph signal and a wave of reference frequency, including a differentiator circuit, means to apply said received wave to said differentiator circuit to produce pulses at the start of each mark element, a pair of charge-storing devices, control circuits for each of said charge-storing devices, means to apply said start-of-mark pulses to said control circuits, means to apply timing waves of period substantially equal to that of said received waves and opposing phase relationship to said control circuits, monostable multivibrator circuits coupled to said control circuits, further differentiator circuits, means to apply one of said timing waves to said differentiator circuits to produce conditioning pulses, means to apply said conditioning pulses to said multivibrator circuits to condition the same for operation at the transitions of said timing waves and upon the charges in said charge-storing devices reaching a predetermined value, said multivibrator having different operating periods and a common output circuit coupled to both of said multivibrators.

12. An electronic circuit arrangement for adjusting the phase relationship existing between a received mark-space telegraph signal wave and a locally generated wave upon the basis of which timing waves are to be generated, including a differentiator circuit, means to apply said received wave to said differentiator circuit to produce pulses at the start of each mark element, a pair of charge-storing devices, control circuits for each of said charge-storing devices, means to apply said start-of-mark pulses to said control circuits, means to apply timing waves of period substantially equal to that of said received waves and opposing phase relationship to said control circuits, monostable multivibrator circuits coupled to said control circuits, further differentiator circuits, means to apply one of said timing waves to said differentiator circuits to produce conditioning pulses, means to apply said conditioning pulses to said multivibrator circuits to condition the same for operation at the transitions of said timing waves and upon the charges in said charge-storing devices reaching a predetermined value, said multivibrator having different operating periods, a cathode follower circuit means to apply said locally generated wave to said cathode follower circuit, an additional differentiating circuit coupled to said cathode follower circuit to produce a train of pulses one for each cycle of said locally generated wave, said cathode follower circuit being coupled in common to both of said multivibrators, thereby to increase or decrease the number of said pulses of said train of pulses in accordance with the one of said multivibrator operating in response to the direction of phase difference between said received telegraph signal wave and said locally generated wave, and means to regenerate said timing waves in response to said train of pulses as adjusted.

13. An electronic circuit arrangement for separating an aggregate plural-condition, multi-channel time-division multiplex signal wave into the constituent elements thereof, including an input circuit arranged to produce output signal trains of substantially perfect signal form and opposing phase relationship in response to application of said multiplex signal wave, means to differentiate said output signal trains, a bistable multivibrator circuit, means to apply said differentiated output signal trains to said bistable multivibrator circuit to produce output pulse trains indicative of the direction of transitions between successive conditions of said multiplex signal wave, a plurality of coincidence tube circuits, means to apply said output pulse trains and timing waves harmonically related to said multiplex signal train to permute the phases of said waves in said coincidence tube circuits whereby all phases are in positive coincidence in but one of said coincidence tube circuits at a given time, and a plurality of gating circuits one each individual to said coincidence tube circuits for deriving a pulse output corresponding to the signal element under consideration.

14. An electronic circuit arrangement for shifting the phase of a locally generated wave into coincidence with a received plural-condition telegraph signal wave, including a phase detector circuit arranged to produce current pulses of length indicative of the direction of a predetermined phase difference between said waves, a differentiator circuit to differentiate said locally generated wave to produce a pulse train, the number of pulses being directly proportional to the number of cycles of said locally generated wave, means to regenerate said locally generated wave in accordance with said pulse train, and means to apply said current pulses to said differentiator circuit to decrease and increase the number of pulses in said pulse train to adjust the phase relationship of said regenerated wave with respect to said received signal wave.

15. An electronic circuit arrangement for shifting the phase of a given periodic wave into coincidence with a predetermined periodic wave including a phase detector circuit arranged to produce current pulses of length indicative of the direction of a predetermined phase difference between said waves, a differentiator circuit to differentiate said given wave to produce a pulse train, the number of pulses being directly proportional to the number of cycles of said given wave, means to regenerate said given wave in accordance with said pulse train, and means to apply said current pulses to said differentiator circuit to decrease and increase the number of pulses in said pulse train to adjust the phase relationship of said regenerated wave with respect to said predetermined wave.

16. An electronic circuit arrangement for separating aggregate Higgitt code signal train into the dot and dash elements of the respective channels thereof, including an input circuit, means to apply said signal train to said input circuit to produce output signal trains of substantially perfect signal form and opposite phase relationship with respect to each other, differentiator circuits coupled to said input circuits individually to receive said output signal trains and to produce in response thereto trains of positive and negative pulses occurring for each transition in said output signal trains, a pair of electron discharge structures individually connected to said differentiator circuits, said electron discharge structures being biased to accept pulses of one polarity only to produce a single output transition pulse at each signal transition, a plurality of electron discharge devices, said output transition pulses being applied to pairs of said devices, a source of timing waves harmonically related to the period of the received signal train, said timing waves being applied to some of said electron discharge devices in given phase and to the others of said electron discharge devices in opposite phase to permute the phases between said devices whereby all phases are in positive coincidence in but one of said electron discharge devices at a time, output circuits individual to said electron discharge devices for deriving a pulse output in one of said output circuits corresponding to the signal element under consideration, each of said output circuits comprising a charge storing device and a further electron discharge device.

17. An electronic circuit arrangement for synchronizing a locally generated timing wave with a received wave under control of said timing wave, including an input circuit to which said received wave is applied, a timing wave generator arranged to produce a timing wave, a phase-detector circuit coupled to said input circuit and said timing-wave generator to determine the phase relationship between said received wave and said timing wave, and a phase shifting circuit coupled between said phase detector circuit and said timing wave generator to adjust the output wave of the latter into substantial synchronism with said received wave, said phase shifting circuit comprising means effective to inject additional cycles in said timing wave and to eject cycles of said timing wave in response to the output of said phase detector circuit.

18. An electronic circuit arrangement for synchronizing a timing wave with constituent signal elements of a received plural-condition, telegraph signal train under control of said timing wave, including an input circuit to which said signal is applied, a timing wave generator arranged to produce a timing wave, a phase-detector circuit coupled to said input circuit and said timing-wave generator to determine the phase relationship between said signal train and said timing wave, and a phase shifting circuit coupled between said phase-detector circuit and said timing wave generator to adjust the output wave of the latter into substantial synchronism with said signal train, said phase-shifting circuit comprising means effective to inject additional cycles in said timing wave and to eject cycles of said timing wave in response to the output of said phase detector circuit.

19. A system for the operation of regenerating, channeling and printing devices in synchronism with telegraph signals, comprising means for producing impulsive voltages of predetermined duration in correspondence with the edges of said incoming telegraph signals, means to produce a constant frequency wave, means for producing a train of operating pulses from said wave of constant frequency, correcting means operative within the duration of said impulsive voltages to add or suppress operating pulses from said train, frequency dividing means for dividing by a fixed factor the number of pulses of said corrected train of pulses, a cyclical timing device in the form of a pulse distributor connected to said frequency dividing means and controllable by the output pulses of said frequency dividing means to operate advance and retard gating means in succession, means for applying said impulsive voltages to said advance and retard gating means, means connecting said advance and retard gating means to said correcting means whereby the correcting means determines the addition and suppression of a predetermined number of operating pulses for every impulsive voltage transmitted by said advance and retard gating means, and connecting means to derive from said distributor or from said frequency dividing means at will output pulses synchronized with said received signals for operation of said regenerating, channeling and printing devices.

20. A synchronizing system for a signal receiver comprising, a receiving circuit for incoming signals, means controlled by said received signals for producing control pulses in timed relation with said signals, a generator for producing a timing wave of constant frequency, pulse producing means controlled by said generator for producing a train of operating pulses, a pulse counter operated by said operating pulses and producing output pulses at a rate of one output pulse for a fixed plurality of input pulses, a phase detector for sensing the phase relation between said control pulses and the output pulses of said counter, means controlled by said phase detector in response to a phase difference in one direction for controlling said pulse producing means to increase the number of pulses in the pulse train supplied to said counter, and means controlled by said phase detector in response to a phase difference in the opposite direction for controlling said pulse producing means to decrease the number of pulses in the pulse train supplied to said counter.

21. Apparatus for generating a first oscillation of the same frequency F as that of a second oscillation, and for maintaining a predetermined phase relationship between said first and second oscillations, comprising a frequency dividing circuit to provide one output pulse for every $n$ pulse applied to the input thereof, where $n$ is an integer greater than unity, a source of operating pulses of frequency $n$F connected to operate said frequency dividing circuit to produce said first oscillation at the output of said circuit, and a phase correcting device controlled by said first and second oscillations and being responsive to a change in phase between said first and second oscillations in one direction to cancel one of said operating pulses, and being responsive to a change in phase in the opposite direction to interlace at least one further pulse with said operating pulses.

References Cited in the file of this patent

UNITED STATES PATENTS

| | | |
|---|---|---|
| 2,513,910 | Bliss | July 4, 1950 |
| 2,540,167 | Houghton | Feb. 6, 1951 |